Patented June 18, 1935

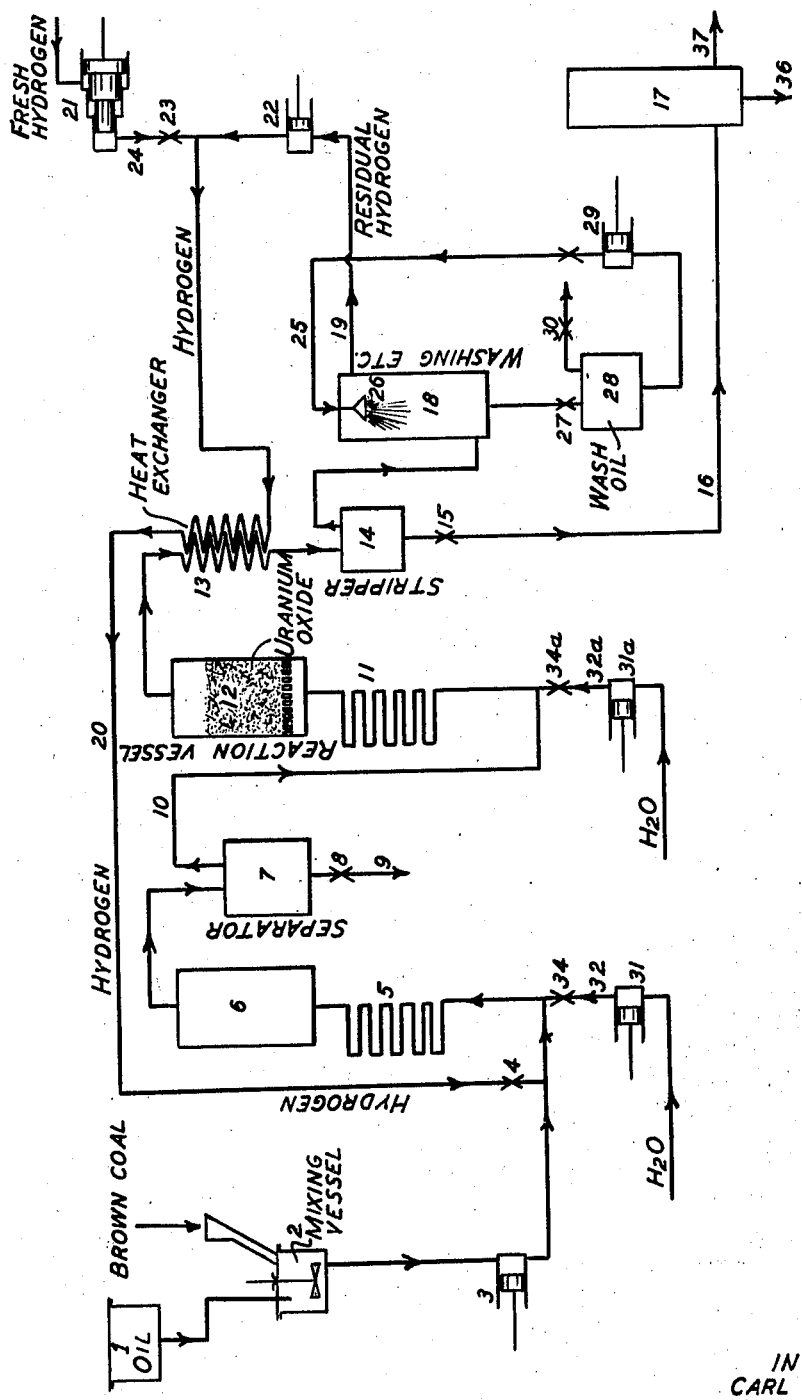

2,005,192

UNITED STATES PATENT OFFICE 2,005,192

CONVERSION OF SOLID FUEL AND PRODUCT DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,648
In Germany February 14, 1925

15 Claims. (Cl. 196—53)

Our invention relates to the destructive hydrogenation of carbonaceous materials and, in particular, to that process which is carried out in the presence of a catalyst immune to sulphur poisoning as described and claimed in our copending application Serial No. 86,646, now Patent No. 1,890,434 of which this application is a continuation-in-part.

The object of our invention is to provide a catalyst which will act efficiently in the promotion of the conversion of carbonaceous substances into valuable liquids by destructive hydrogenation.

In our application Ser. No. 86,646 which contains claims generically directed to the carrying out of the process in the presence of a catalyst immune to sulphur poisoning it is stated that the metals of the sixth group of the periodic system or their compounds are suitable for use as catalysts immune to sulphur poisoning. Inter alia it has also been shown in the said application Ser. No. 86,646 that of this group uranium in the form of its oxide or carbonate, if desired together with zinc oxide, may be employed as a catalyst. It is the utilization of uranium as a catalyst in the destructive hydrogenation process that the present application is concerned with and its claims are specifically directed to.

We have found that this metal and its compounds are particularly suitable for use in this process, either alone or in combination with other materials; such as other metals of the sixth group of the periodic system and compounds thereof, compounds of nitrogen, compounds containing combined sulphur, particularly sulphides of heavy metals, compounds of silver, copper, cadmium, lead, bismuth and tin, lithium oxide or carbonate, magnesite, boric acid, alumina, rare earths, oxides and carbonates of zinc, manganese and vanadium, oxides of metals of the fourth group of the periodic system, as for example titanium oxide, or stannous oxide, and difficultly reducible oxides of other metals.

The said catalysts may be added in any suitable manner. They may be added to the solid or liquid material, or in the case of liquids they may be placed into the reaction vessel and the liquids brought into contact with them in a vaporized or otherwise finely divided state. Other bodies, for example, lumps of brick, quartz, asbestos, coke, active carbon, silica gel, metals, especially heavy metals, or metal oxides, or carbides, or mixtures of such bodies, may also be present in the reaction chamber. The said bodies have the effect of avoiding the formation of carbon deposits and of facilitating the distribution of the hydrogenating gas.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above-mentioned materials, such as cracked products, coumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and in the case of solid substances rendering their introduction easier. All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly. The addition of water, which is preferably employed in an amount of about 10 per cent by weight of the carbonaceous materials to be introduced into the reaction vessel, has the effect of reducing the partial pressure of the oils whereby a more effective hydrogenation may take place.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by carrying out the process in two parts or stages. In the first stage the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydorgen sulphide, water vapour or methane or other hydrocarbons. Or the hydrogen may be generated in the reaction chamber by the interaction of water and carbon monoxide, and by similar reactions. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally the temperature ranges between 300° and 700° C., and the pressure, when used, should amount to at least 20 atmospheres, and should, preferably, be much higher up to about 2000 atmospheres.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighbourhood of .3 to .8 volume of oil per hour per volume of reaction space. Vaporous materials may be treated at higher temperatures and the feed rate may consequently be one or even one and one-half volumes per hour per volume of reaction space The volume of hydrogen may likewise vary considerably and should always, of course, be in excess of that actually required for the conversion; for example, the rate of flow of hydrogen may be in excess of about 600 litres per kilogram of carbonaceous material.

A suitable arrangement of apparatus for carrying out the process is illustrated in the accompanying drawing. The process may be further described with reference thereto.

Finely ground browncoal is pasted in the mixing vessel 2 with oil from the tank 1 and the mixture is thereafter forced by means of pump 3 together with hydrogen which is supplied from conduit 20, through the pre-heater 5, into the reaction vessel 6. The regulation of the amount of hydrogen necessary for the conversion is effected by means of valve 4. The separation of the solid and fluid and gaseous and vaporous portions takes place in the separator 7. The fluid and solid portions are released through valve 8 and removed from the reaction system through conduit 9, whereas the gaseous and vaporous parts are further heated in a coil 11 and then conducted into the second vessel 12, which is filled with uranium oxide. The distilled reaction products give off their heat in the heat exchanger 13 to the entering hydrogen and are thereby condensed. The obtained low boiling products are released from the stripper 14 through valve 15 and are conducted into a supply tank 17 by means of a conduit 16, whereas the hydrogen is conducted into the washer 18 and is there freed from the gaseous hydrocarbons with the assistance of oil. The oil is introduced into the upper part of the washer by means of conduit 25, sprayed through a nozzle 26 and again drawn off on the bottom. The oil is released through valve 27 into a receiver 28, from which the dissolved hydrocarbons escape through conduit 30. The oil is drawn off by means of pump 29, compressed and returned into the washer. The purified hydrogen leaves the washer through conduit 19 and is re-introduced into the system by the rotating pump 22 through conduit 20. Fresh hydrogen, compressed by means of compressor 21, may be introduced through conduit 24, the amount of such hydrogen being regulated by valve 23.

In case a catalyst is used in the first step, the addition is preferably made in the mixing vessel 2.

In case the conversion is to be made in the presence of water vapor, water is introduced by means of pumps 31 and 31a respectively, through conduit 32, into the reaction vessel 6, or through conduit 32a into the second reaction vessel 12. The regulation of the necessary amount of water is effected by means of valves 34 and 34a respectively. The water evaporates in the coils 5 and 11, is condensed behind the reaction oven in the heat exchanger 13 and collected at the bottom of tank 17. From there it may be drawn off through conduit 36, whereas the benzine is removed through an opening 37 positioned at a higher level in the tank.

The following examples will serve to further explain how our invention is carried out in practice, but we do not restrict our invention to these examples.

*Example 1*

Brown coal producer tar is continuously passed in a current of hydrogen, under a pressure of 800 atmospheres, and at a temperature of about 500° C., over a catalyst consisting of a mixture of compounds of uranium and zinc, for example, a mixture of their oxides. The product obtained consists of up to 50 per cent of gasoline.

*Example 2*

Dark coloured residues of American rock oil, which at ordinary temperature are nearly solid and have a strongly unsaturated character are incorporated with an excess of hydrogen and continuously passed under a pressure of 200 atmospheres and at a temperature of from 450° to 500° C. over a catalyst prepared from an intimate mixture of 70 parts, by weight, of ammonium molybdate and 30 parts of uranium oxide. A nearly colourless, mobile and saturated product is obtained consisting of 90 per cent of colourless petrol boiling up to 150° C. and 10 per cent of a thin, yellowish product of high boiling point.

Example 3

Jura shale oil of a specific gravity of 0.950 containing 4 per cent of sulphur and which, on distillation, yields 6 per cent petrol boiling up to 150° C. and 21 per cent of a pitch-like residue at a temperature above 350° C., is treated as described in the foregoing example but with a catalyst prepared from ammonium uranate and chromium oxide by reduction with hydrogen. The product is a mobile, yellowish oil of about 0.810 specific gravity containing 80 per cent of saturated petrol boiling up to 150° C. and leaving at 200° C. a liquid only slightly coloured residue.

Example 4

Mexican asphaltum is dissolved in its own weight of cyclohexane and treated in the aforedescribed manner but with a catalyst containing about equimolecular proportions of uranium oxide and tungsten sulphide. The cyclohexane is recovered unaltered, while the asphaltum which before the treatment contained 4 per cent compounds boiling up to 250° C., 25 per cent more boiling up to 350° C., and 70 per cent of a hard pitch residue is converted into a mobile oil, free from oxygen compounds and chiefly consisting of petrol hydrocarbons besides a very small vaseline-like residue.

Rock oils of any origin may be treated as described in the above examples and thereby converted into refined products of much more valuable properties.

Example 5

Brown coal is intimately mixed with 1 per cent of its weight of a mixture of about equimolecular proportions of molybdic acid and uranium oxide and introduced into a vessel capable of withstanding high pressure, in which it is treated at about 500° C., and under a pressure of 150 atmospheres with a stream of hydrogen. The coal is quickly and nearly completely transformed into valuable thin hydrocarbon.

Example 6

Cresol is passed in the form of vapour together with hydrogen at a temperature of about 450° C. and under a pressure of 200 atmospheres over a catalyst consisting of or containing uranium sulphide. In this manner a product is obtained of which 20 per cent consists of neutral oil. The same results are obtained if uranium nitride is employed instead of uranium sulphide.

Our invention is not confined to the above examples; the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

What we claim is:—

1. The process of destructively hydrogenizing carbonaceous substances, such as solid and liquid fuels, distillation and extraction products thereof, which comprises treating them with hydrogen, in the presence of a catalyst containing uranium, and heat at a temperature between about 300° and 700° C. sufficient to promote the reaction and at a pressure of at least 20 atmospheres.

2. The process of destructively hydrogenizing carbonaceous substances, such as solid and liquid fuels, distillation and extraction products thereof, which comprises treating them with hydrogen, in the presence of a catalyst containing uranium, and heat at a temperature between about 300° and 700° C. sufficient to promote the conversion and at a pressure of at least 20 atmospheres, the conditions of working, such as temperature, pressure and the efficiency of the catalyst, being so adapted to each other as to give rise to the formation of substantial amounts of low boiling hydrocarbons of a benzine character.

3. The process of destructively hydrogenizing carbonaceous substances, such as solid and liquid fuels, distillation and extraction products thereof, into valuable liquids, which comprises treating them with a stream of hydrogen, in the presence of a catalyst containing uranium, and heat at a temperature between about 300° and 700° C. sufficient to promote the conversion and at a pressure of at least 20 atmospheres.

4. The process of destructively hydrogenizing carbonaceous substances, such as solid and liquid fuels, distillation and extraction products thereof which comprises treating them with hydrogen, in the presence of a catalyst containing uranium, and of a substantial amount of water, and heat at a temperature between about 300° and 700° C. sufficient to promote the reaction and at a pressure of at least 20 atmospheres.

5. The process of converting carbonaceous substances, such as solid and liquid fuels, distillation and extraction products thereof, into valuable liquids which comprises treating them with hydrogen, in the presence of a catalyst containing uranium, and heat at a temperature of between about 300° and 700° C. and at a pressure of at least 20 atmospheres.

6. The process of converting carbonaceous substances such as solid and liquid fuels, distillation and extraction products thereof, into valuable liquids which comprises treating them with hydrogen, in the presence of a catalyst containing uranium, and of a substantial amount of water, and heat at a temperature of between about 300° and 700° C. and at a pressure of at least 50 atmospheres.

7. The process of producing liquids from solid fuel materials which comprises destructively hydrogenating the initial material, in the presence of a catalyst containing uranium, at a pressure of at least 20 atmospheres and at a temperature of between about 300° and 700° C.

8. The process of producing liquid hydrocarbons from lignite which comprises destructively hydrogenating the initial material in the presence of a catalyst containing uranium, at a pressure of at least 20 atmospheres and at a temperature of between about 300° and 700° C.

9. The process of converting carbonaceous substances, such as solid and liquid fuels, distillation and extraction products thereof, into valuable liquids which comprises treating them with a continuous stream of hydrogen and a substantial amount of water and heat at a temperature of between about 300° and 700° C. and at a pressure of at least 50 atmospheres in the presence of a catalyst containing uranium.

10. The process of converting carbonaceous substances, such as solid and liquid fuels, distillation and extraction products thereof, into valuable liquids which comprises treating a mixture of one of said substances with another of said substances of more recent geological age than the first by destructive hydrogenation in the presence of a catalyst containing uranium, under a pressure of at least 20 atmospheres and at a temperature of between about 300° and 700° C.

11. The process of destructively hydrogenizing carbonaceous substances, such as solid and liquid fuels, distillation and extraction products thereof, containing asphaltic hydrocarbons, into valuable liquids which comprises treating them with hydrogen in the presence of a catalyst containing uranium, and at a temperature between about 300° and 700° C. sufficiently high for the conversion and at a pressure of at least 20 atmospheres for a period such that, under the conditions as above given, the product is substantially free from asphalt.

12. The process of converting carbonaceous substances such as solid and liquid fuels, distillation and extraction products thereof, containing asphaltic hydrocarbons, into valuable liquids which comprises continuously feeding the said substances with hydrogen into a reaction space containing a catalyst containing uranium, and held at a temperature of between about 300° and 700° C. while maintaining a pressure of at least 200 atmospheres in said space, the conditions as above given being adjusted to permit of continuously removing resulting products substantially free from asphaltic hydrocarbons.

13. The process of destructively hydrogenizing carbonaceous substances, such as solid and liquid fuels, distillation and extraction products thereof, which comprises treating them with hydrogen, in the presence of a catalyst containing uranium sulphide, and heat at a temperature between about 300° and 700° C. sufficient to promote the reaction and at a pressure of at least 20 atmospheres.

14. The process of destructively hydrogenizing carbonaceous substances, such as solid and liquid fuels, distillation and extraction products thereof, which comprises treating them with hydrogen, in the presence of a catalyst containing uranium nitride, and heat at a temperature between about 300° and 700° C. sufficient to promote the reaction and at a pressure of at least 20 atmospheres.

15. The process of destructively hydrogenizing carbonaceous substances, such as solid and liquid fuels, distillation and extraction products thereof which comprises treating them with hydrogen in the presence of a catalyst containing uranium oxide at a temperature between about 300° and 700° C. sufficient to promote the reaction and under a pressure of at least 20 atmospheres.

CARL KRAUCH.
MATHIAS PIER.